(12) United States Patent
Baek

(10) Patent No.: US 11,297,232 B2
(45) Date of Patent: Apr. 5, 2022

(54) APPARATUS AND METHOD FOR PRODUCING SLOW MOTION VIDEO

(71) Applicant: Samsung Electronics Co., Ltd., Gyeonggi-do (KR)

(72) Inventor: Woohyun Baek, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 16/735,813

(22) Filed: Jan. 7, 2020

(65) Prior Publication Data
US 2020/0244884 A1    Jul. 30, 2020

(30) Foreign Application Priority Data

Jan. 25, 2019    (KR) ........................ 10-2019-0009757

(51) Int. Cl.
  *H04N 7/01*    (2006.01)
  *H04N 5/232*   (2006.01)
  *H04N 5/04*    (2006.01)

(52) U.S. Cl.
  CPC ........... *H04N 5/23245* (2013.01); *H04N 5/04* (2013.01)

(58) Field of Classification Search
  CPC ...... H04N 5/232; H04N 5/23245; H04N 5/04; H04N 5/92; H04N 21/432; H04N 5/77; H04N 5/783; H04N 7/01
  USPC ............... 348/222.1, 441, 443; 386/248, 239
  See application file for complete search history.

(56) References Cited

U.S. PATENT DOCUMENTS

| | | | |
|---|---|---|---|
| 8,903,222 B2 * | 12/2014 | Miyakoshi ............. | H04N 5/783 386/248 |
| 9,978,139 B2 * | 5/2018 | Kriheli ................ | G07F 17/0092 |
| 10,165,222 B2 * | 12/2018 | Baran .................. | H04N 5/3532 |
| 2007/0091204 A1 | 4/2007 | Koshimizu et al. | |
| 2010/0080477 A1 | 4/2010 | Almbladh | |
| 2016/0267623 A1 | 9/2016 | Heo | |
| 2017/0035075 A1 | 2/2017 | Ugolini et al. | |
| 2017/0064245 A1 | 3/2017 | Liu et al. | |
| 2017/0180589 A1 | 6/2017 | Guo et al. | |
| 2018/0225941 A1 | 8/2018 | Kim et al. | |
| 2018/0359455 A1 | 12/2018 | Kuriyama | |

FOREIGN PATENT DOCUMENTS

| KR | 10-1223424 B1 | 1/2013 |
|---|---|---|
| KR | 10-2017-0074538 A | 6/2017 |
| KR | 10-2018-0090695 A | 8/2018 |
| KR | 10-2018-0090696 A | 8/2018 |

OTHER PUBLICATIONS

International Search Report dated Apr. 14, 2020.

* cited by examiner

Primary Examiner — Trang U Tran
(74) Attorney, Agent, or Firm — Cha & Reiter, LLC.

(57) ABSTRACT

Various embodiments provide an electronic device including: a camera comprising an image signal processor configured to process a video output from an image sensor; a memory; and a processor, wherein the processor is configured to: obtain the processed video from the image signal processor; extract a portion of the obtained video to detect motion; synchronize the obtained video with the extracted video, based on the motion detection; produce a slow motion video by converting a frame rate of the synchronized video; and encode the produced slow motion video and store the same in the memory, and a method thereof. Various embodiments may be provided.

14 Claims, 10 Drawing Sheets

APPARATUS AND METHOD FOR PRODUCING SLOW MOTION VIDEO

CROSS-REFERENCE TO RELATED APPLICATION(S)

This application is based on and claims priority under 35 U.S.C. 119 from Korean Patent Application No. 10-2019-0009757, filed on Jan. 25, 2019, in the Korean Intellectual Property Office, the disclosure of which is herein incorporated by reference in its entirety.

BACKGROUND

1) Field

Various embodiments of the disclosure disclose a method and an apparatus for producing a slow motion video.

2) Description of Related Art

With the development of digital technology, various types of electronic devices, such as mobile communication terminals, personal digital assistants (PDAs), electronic notebooks, smart phones, tablet personal computers (PCs), wearable devices, and the like, are widely used. In order to support and expand functions of the electronic device, hardware and/or software components of the electronic device are continuously improved. For example, the electronic device provides a photographing function using a camera or a payment function using short-range wireless communication.

The above information is presented as background information only to assist with an understanding of the disclosure. No determination has been made, and no assertion is made, as to whether any of the above might be applicable as prior art with regard to the disclosure.

SUMMARY

An electronic device according to various embodiments may include: a camera including an image signal processor configured to process a video output from an image sensor; a memory; and a processor, wherein the processor may be configured to: obtain the processed video from the image signal processor; extract a portion of the obtained video to detect motion; synchronize the obtained video with the extracted video, based on the motion detection; produce a slow motion video by converting a frame rate of the synchronized video; and encode the produced slow motion video and store the same in the memory.

A method of operating an electronic device according to various embodiments may include: obtaining a video processed by an image signal processor included in a camera of the electronic device; extracting a portion of the obtained video to detect motion; synchronizing the obtained video with the extracted video, based on the motion detection; producing a slow motion video by converting the frame rate of the synchronized video; and encoding the produced slow motion video and storing the same in the memory of the electronic device.

An electronic device according to certain embodiments comprises an image sensor configured to generate a selected higher frame rate video; a buffer configured to buffer the selected higher frame rate video; and at least one processor configured to: receive the selected higher frame rate video directly from the image sensor; generate a selected lower frame rate video from the higher frame rate video, wherein the selected lower frame rate video comprises a sequence of frames; detecting a frame having a degree of motion exceeding a predetermined threshold, said frame having a preceding sequence of frames and a succeeding sequence of frames; identifying from the buffer frames from the selected higher frame rate video that correspond to the frame having a degree of motion exceeding the predetermined threshold; and generating a slow motion video, comprising the preceding sequence of frames, followed by the identified frames from the selected higher frame rate video, followed by the succeeding sequence of frames.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
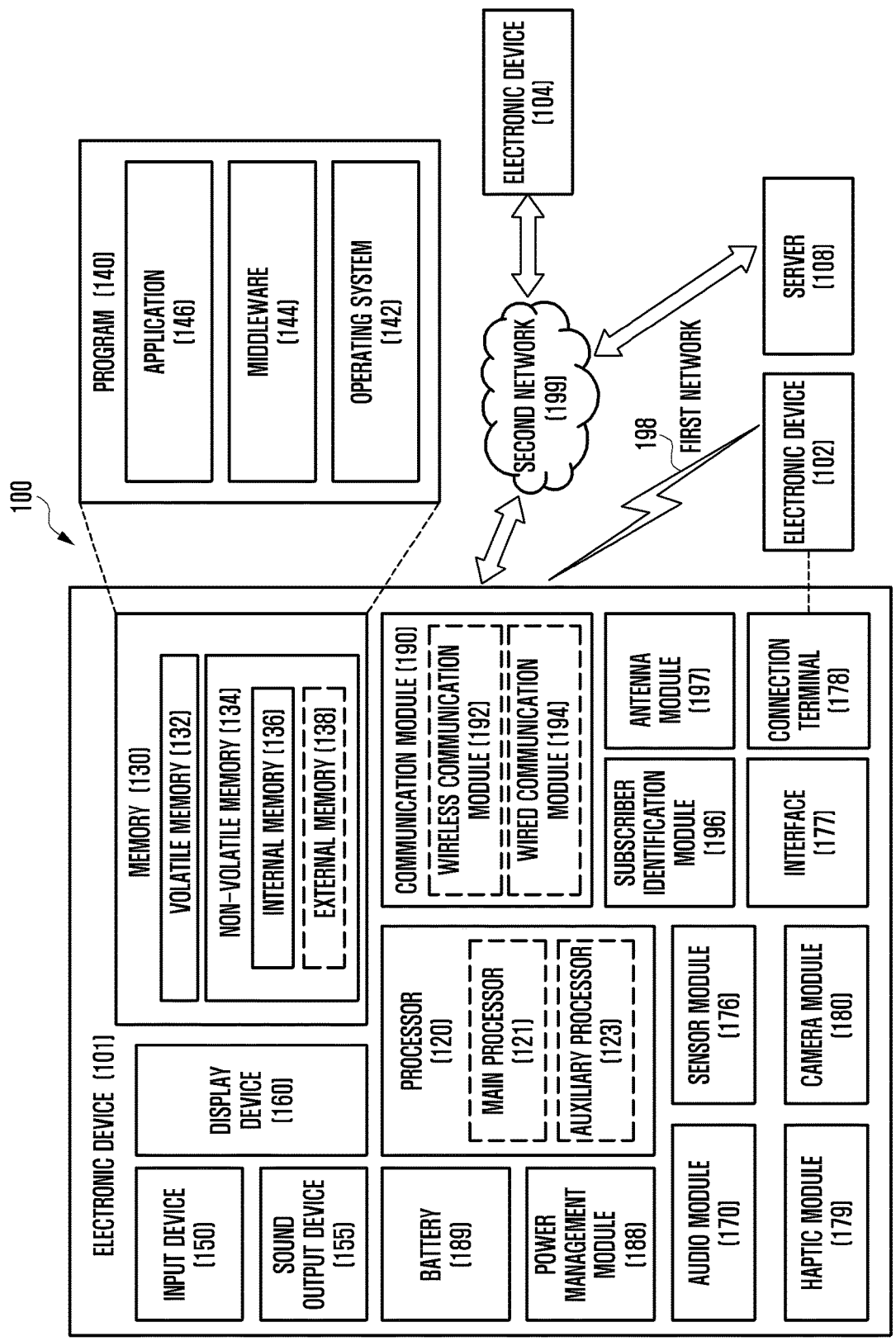
FIG. 1 is a block diagram of an electronic device 101 in a network environment 100 according to various embodiments.

An electronic device may various photographing functions in response to user demand. For example, the photographing function may include "auto", "pro", "panorama", "beauty", "hyperlapse", or "slow motion". Automatic shooting may be performed by the electronic device to automatically set photographing conditions {e.g., sensitivity (ISO), brightness, zoom-in/out, and the like}, and the "pro" function may be shooting according to photographing conditions set by a user. "Panorama" shooting may have a photographing angle wider than a general photographing angle, and "beauty" shooting may detect a human face (e.g., a skin, eyes, etc.) to then automatically correct the same. "Hyperlapse" and "slow motion" functions may be shooting techniques that convert a frame rate. "Hyperlapse" shooting may provide a video (or moving pictures) to be played at a high speed by reducing the number of frames per second, and "slow motion" shooting may provide a video to be played at a slow speed by increasing the number of frames per second. The user may shoot a fast moving object using a slow motion function, thereby recording (or saving) a dynamic moment.

The slow motion shooting may further require a hardware component {e.g., a dynamic random access memory (DRAM)} provided in the electronic device. Including a DRAM an image sensor to obtain a slow motion video has the problem that a slow-motion recording time may vary according to the capacity of the DRAM. Further, addition of the hardware component to the electronic device may increase the price of the electronic device.

Various embodiments may disclose a method and an apparatus for producing a slow motion video using a preview image if an event is detected while the preview video is output using video output from an image sensor.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
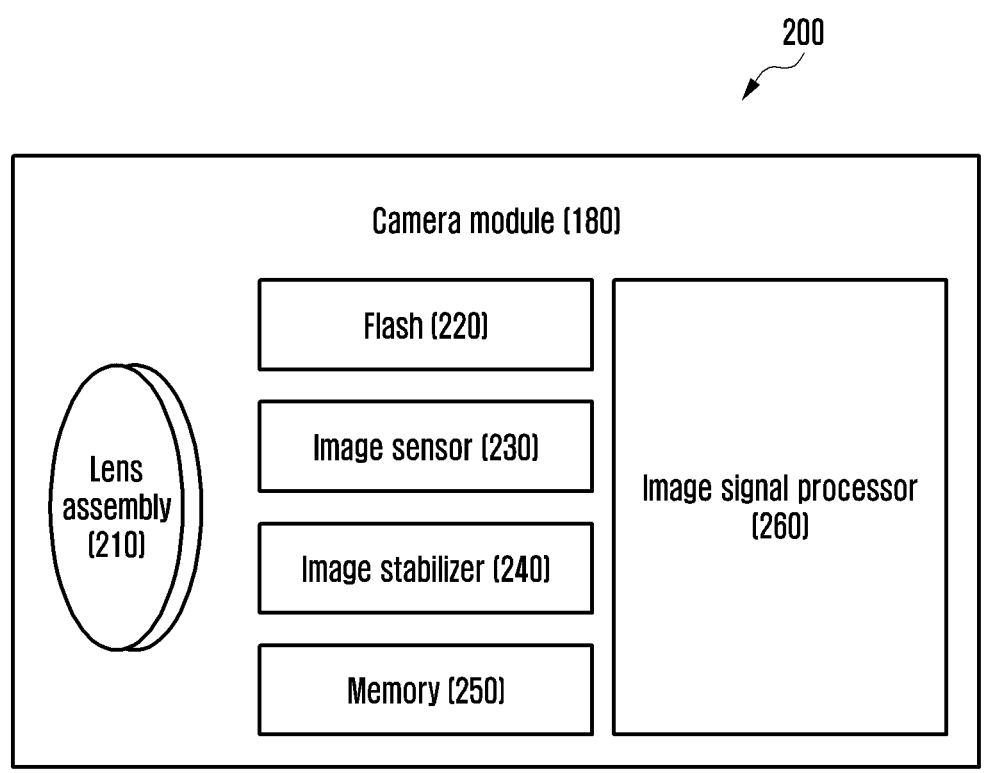
FIG. 2 is a diagram illustrating an example of a camera module according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
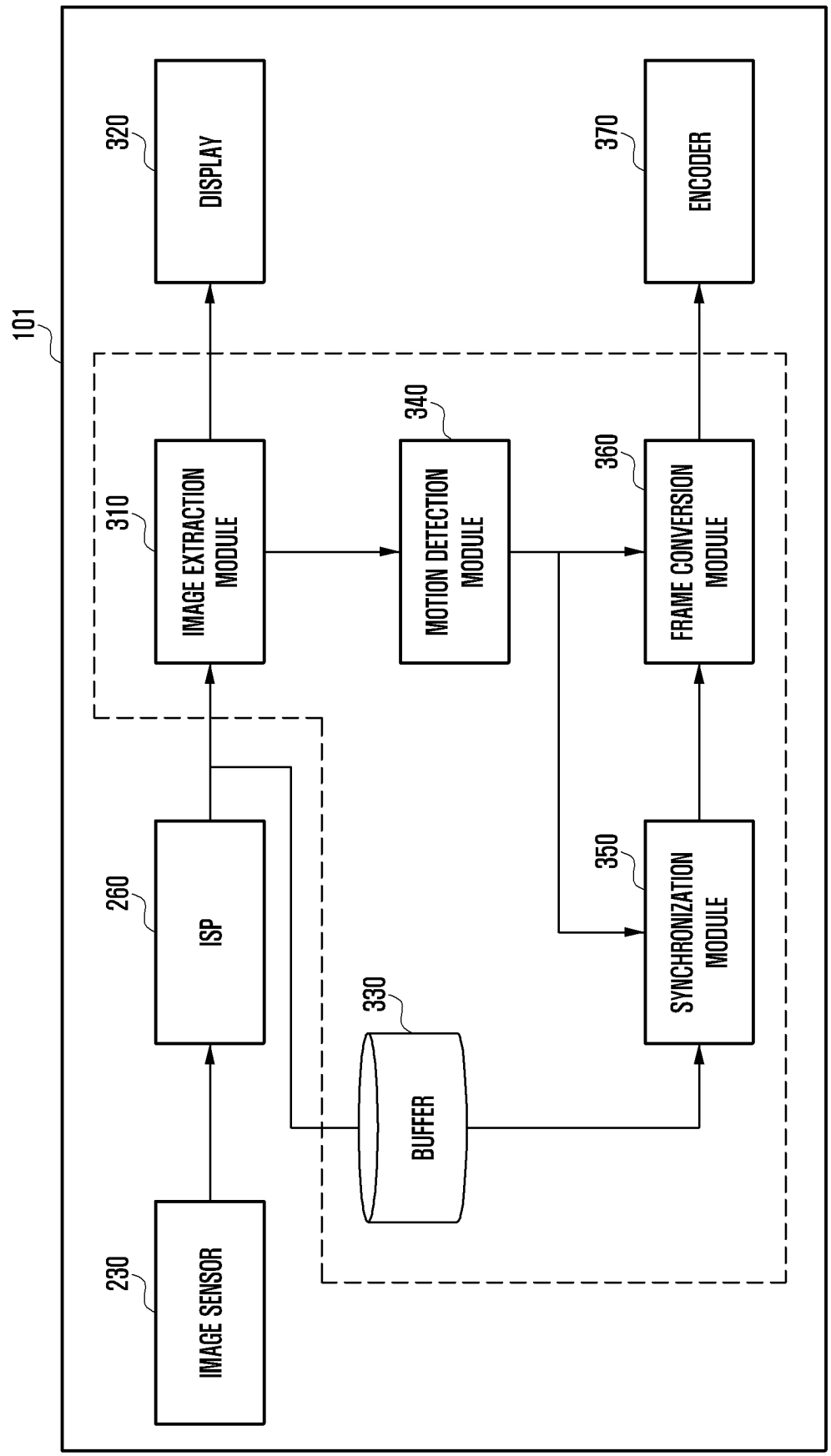
FIG. 3A is a diagram illustrating the configuration of an electronic device according to various embodiments.
Figure 3B:
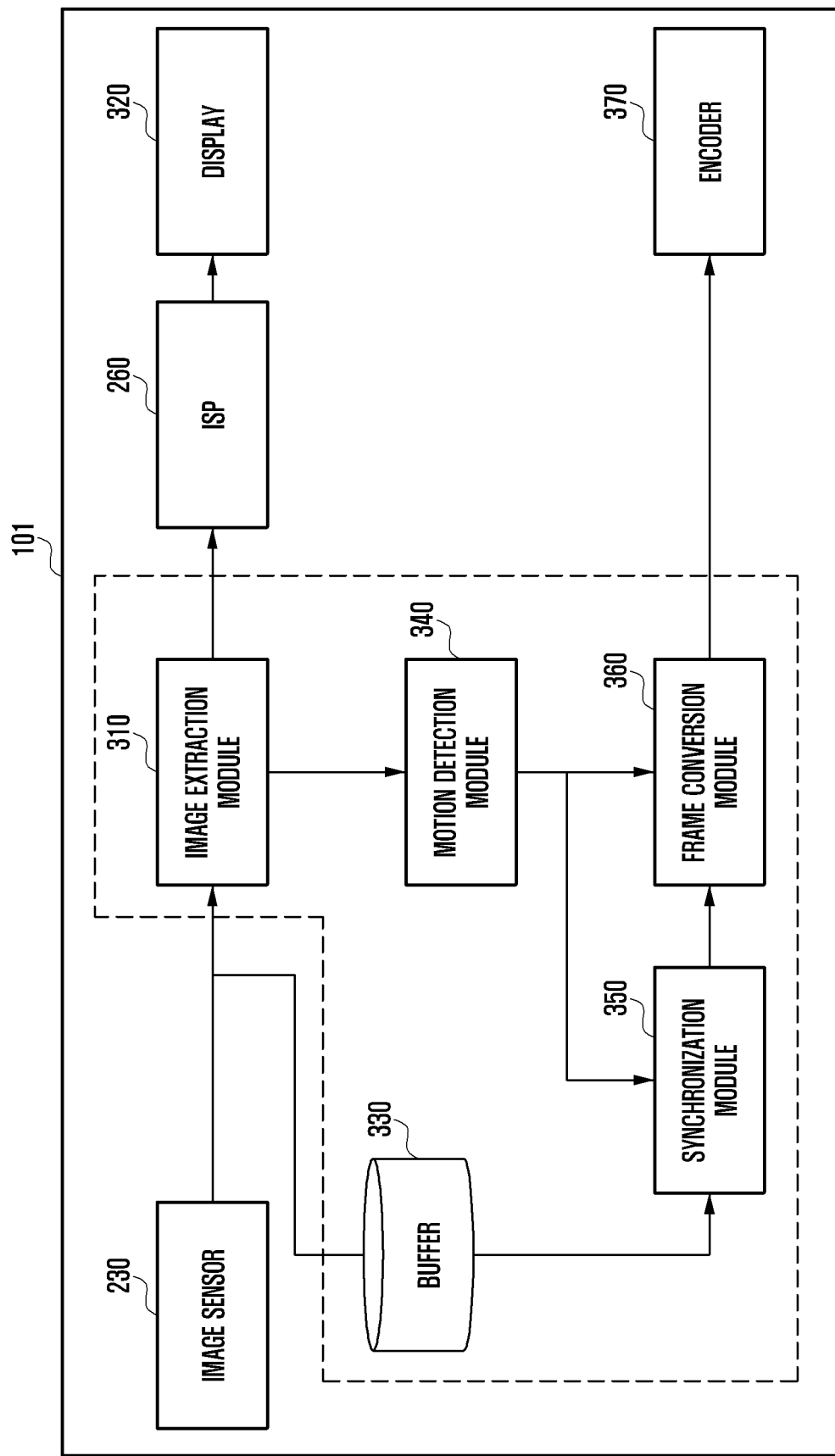
FIG. 3B is a diagram illustrating the configuration of an electronic device according to various embodiments.
Figure 3C:
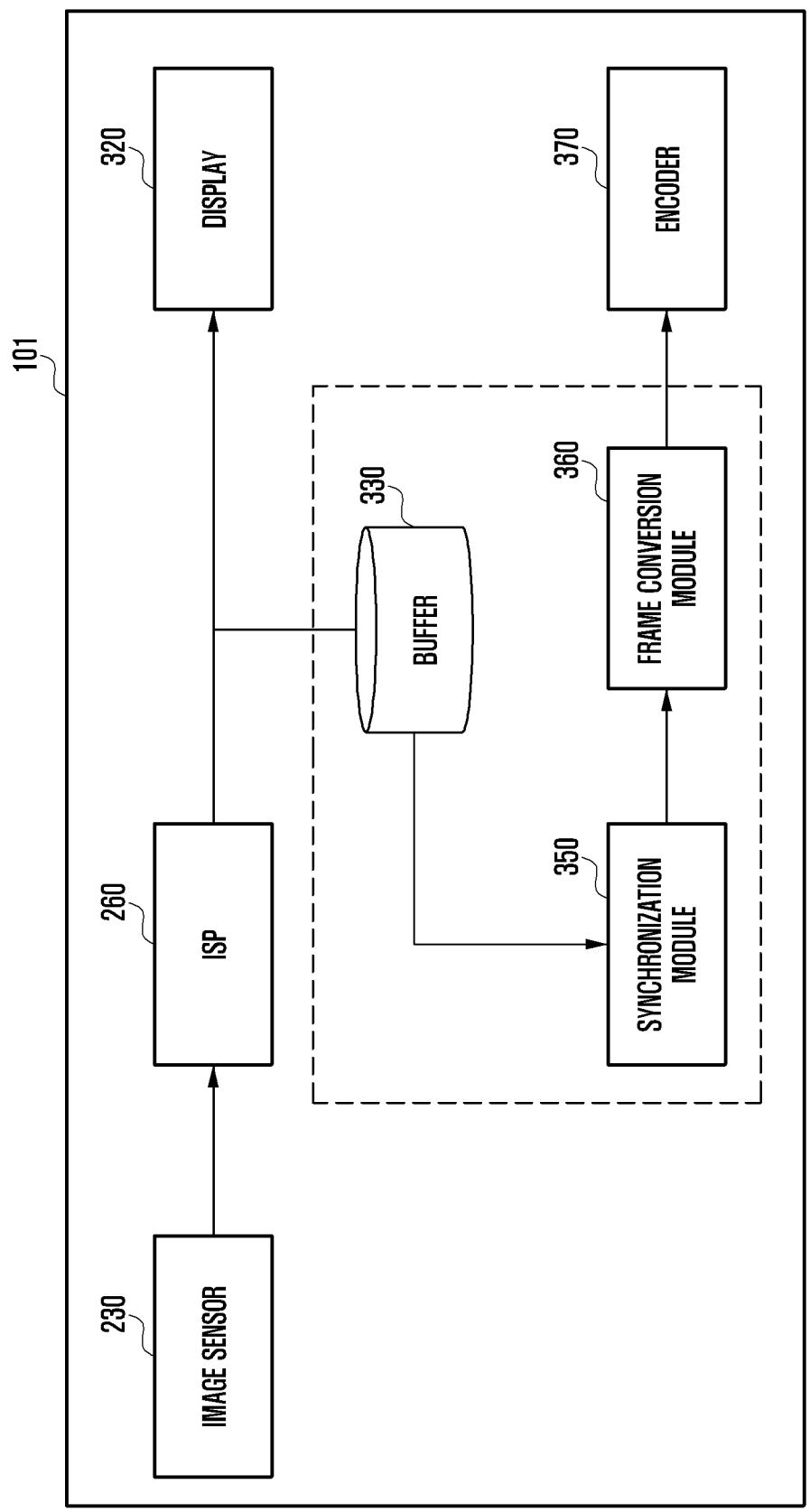
FIG. 3C is a diagram illustrating the configuration of an electronic device according to various embodiments.
Figure 3D:
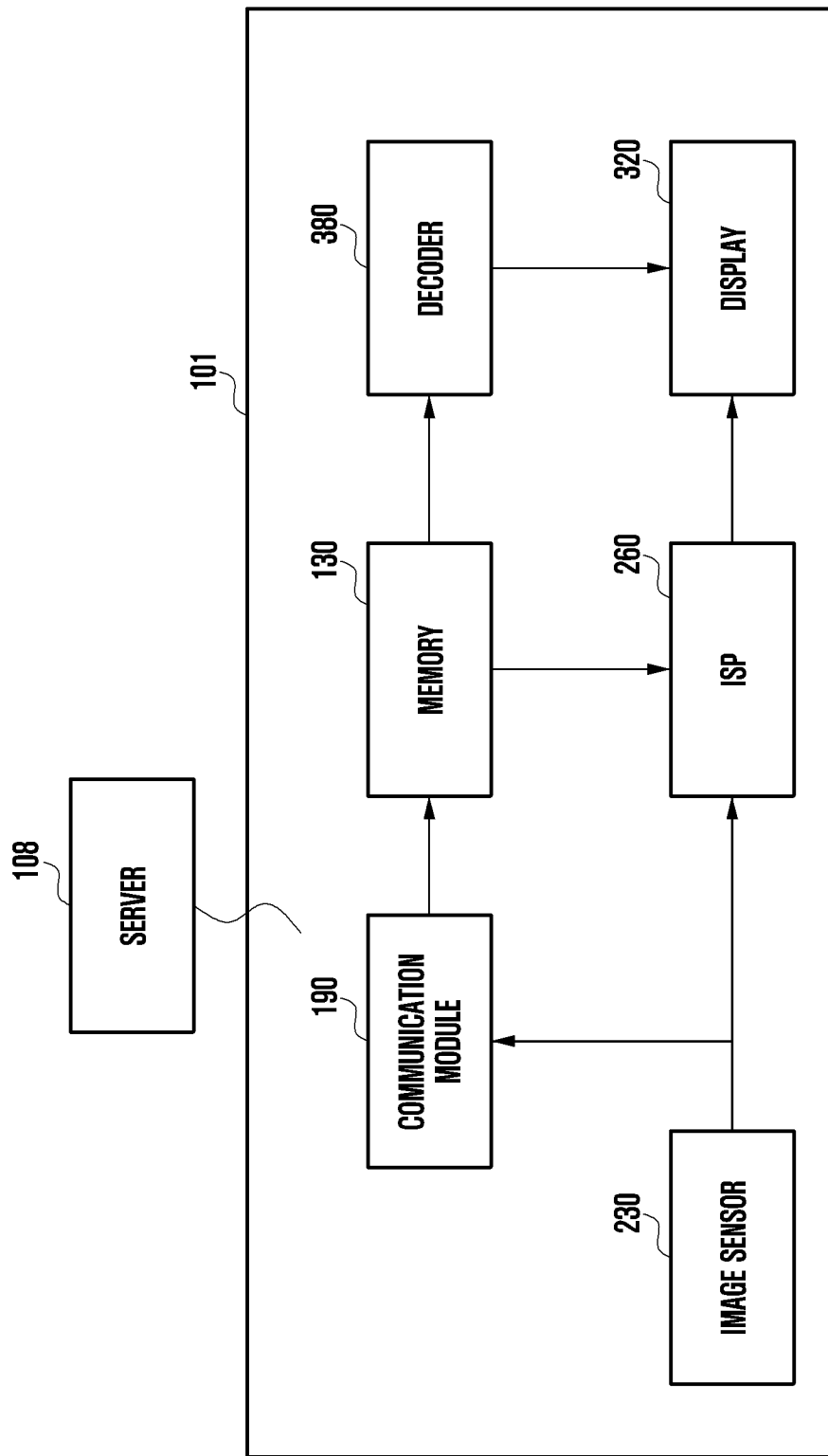
FIG. 3D is a diagram illustrating the configuration of an electronic device according to various embodiments.

FIG. 3A is a diagram illustrating the configuration of an electronic device according to various embodiments, FIG. 3B is a diagram illustrating the configuration of an electronic device according to various embodiments, FIG. 3C is a diagram illustrating the configuration of an electronic device according to various embodiments, and FIG. 3D is a diagram illustrating the configuration of an electronic device according to various embodiments.

FIG. 3A may be a first configuration diagram of an electronic device.

Referring to FIG. 3A, an electronic device (e.g., the electronic device 101 in FIG. 1) according to various embodiments may produce a slow motion video, based on the degree of occurrence of motion between frames or user input. The electronic device 101 may include an image sensor 230, an ISP 260, an image extraction module 310, a display 320, a buffer 330, a motion detection module 340, a synchronization module 350, a frame conversion module 360, and an encoder 370. The image extraction module 310, the buffer 330, the motion detection module 340, the synchronization module 350, and the frame conversion module 360 may be included, as hardware modules or software modules, in a processor (e.g., the processor 120 in FIG. 1) including a processing circuit.

In certain embodiments, the image sensor 230 may receive light from a lens assembly and convert the light into an electrical signal to obtain an image or video. The video obtained by the image sensor can record video in normal mode or slow-motion mode. In the normal mode, the image sensor records video at a selected one of 30 fps, 60 fps, or 90 fps (now referred to as the "selected lower frame rate"). In the slow-motion mode, the image sensor records video at a selected one of 240 fps, 480 fps, or 960 fps (now referred to as the "selected higher frame rate"). It shall be noted that the foregoing numbers are only used as example, and other numbers can also be used. Since the display has a refresh rate that is considerably lower (e.g., the selected lower frame rate) than the selected higher frame rate, the display takes longer to display video recorded at the selected higher frame rate. This gives the appearance of slow motion. For example, if the display has a refresh rate of 60 Hz, and the image sensor records video at 960 fps, one second of recorded video would take 16 seconds to display. This gives the appearance of slow motion, while displaying a unique frame at each refresh.

The ISP 260 stores the selected higher frame rate video in the buffer and provides the selected higher frame rate video to the image extraction module 310. The image extraction module decimates or down-samples the selected higher frame rate video to a selected lower frame rate video and lower resolution suitable for display on the display 320. The image extraction module 310 provides selected lower frame rate video to the display 320 at the lower resolution to the motion detection module 340.

The motion detection module 340 detects frames from the selected lower frame rate video that have high enough motion—motion detection frame. Since the frames are fewer and the resolution is lower, the computational load for the motion detection module 340 is reduced. The motion detection frames from the selected lower frame rate video with lower resolution (or an indicator of the same) are provided to the synchronization module 350. The synchronization module 350 selects frames from the selected higher frame rate video that correspond to the motion detection frame.

For example, if the selected higher frame rate video has 960 fps, the lower selected frame rate video has 60 fps, and the 15$^{th}$ frame of the selected lower frame rate is the motion detection frame, the 225$^{th}$-255$^{th}$ frame may be selected by the frame synchronization module.

In some embodiments, interpolated frame can be placed between the frame for the motion detection frame.

The frame conversion module 360 converts the time base of the 225$^{th}$-255$^{th}$ frame based on the selected lower frame rate, and the time based of the selected lower frame rate video following the motion detection frame.

In some embodiments, the image extraction module 340, the motion detection module 340, and the synchronization module 350 operate on frames contemporaneous with receipt of the frames by the image sensor 230. This alleviates the need for storing large amounts of data between the image sensor 230 and the image extraction module 310.

The image sensor 230 may convert the light emitted or reflected by a subject and transmitted through a lens assembly (e.g., the lens assembly 210 in FIG. 2) into an electrical signal, thereby obtaining an image (or video) corresponding to the subject. In certain embodiments, the image sensor 230 can include a charge coupled device (CCD) or a CMOS image sensor. For example, the image sensor 230 may obtain a video having various frame rates depending on the performance thereof. For example, the video may be obtained (or produced) in at least one of 240 fps (frames per second), 480 fps, or 960 fps.

An image signal processor (ISP) 260 may process one or more images with respect to a video obtained through the image sensor 230 or a video stored in a memory (e.g., the memory 130 in FIG. 1). The processed video may be provided to the buffer 330 and to the image extraction module 310. For example, the ISP 260 may process a video to correspond to the image sensor 230, and may provide the same to the buffer 330 or to the image extraction module 310. In certain embodiments, the ISP 260 may process the video to have the same frames per second as the image sensor 230. The video processed according to the performance of the image sensor 230 may have a selected higher frame rate. The ISP 260 may process a video according to the performance of the display 320 (or a display environment), and may provide the same to the image extraction module 310. The video processed according to the performance of the display 320 may have a selected lower frame rate. Moreover, the display 320 may not have enough pixels to display an image or video at the resolution that the image sensor 230 obtains. Accordingly the frames themselves may have fewer pixels.

According to various embodiments, the ISP 260 may include a rescaler for providing videos having different frame rates. For example, the ISP 260 may provide a video having a selected lower frame rate in a normal shooting mode, and may provide a video having a selected higher frame rate in a slow motion shooting mode (or a super slow motion shooting mode).

The image extraction module 310 may extract a partial video from the video output from the ISP 260. The image extraction module 310 may selectively extract a partial video from the video processed according to the performance of the image sensor 230 (e.g., either the selected higher frame rate or the selected lower frame rate). The image extraction module 310 may provide the extracted video to the display 320 or to the motion detection module 340. For example, the image extraction module 310 may provide the display 320 with a video obtained from the ISP 260 in the normal shooting mode without any processing (e.g., bypass) because the video is intended for the display 320. The image extraction module 310 may extract a portion of the video obtained from the ISP 260 to conform to the display 320 in the slow motion shooting mode, and may extract a portion of the video obtained from the ISP 260 to conform to motion detection. In the case where the video output in the slow motion shooting mode has a frame rate of 960 fps, the image extraction module 310 may decimate or down-sample the frames down to the selected lower frame rate (e.g., for 60 fps, 1 out of every 16 frames, for 120 fps, 1 out of 8, and 240 fps, 1 out of 4) from the output video, and may provide the same to the display 320.

According to various embodiments, the image extraction module 310 may extract some frames or a video having a low resolution from the output video, and may provide the same to the motion detection module 340. If the output video has a frame rate of 960 fps, the image extraction module 310 may decimate or down-sample the frames down to the selected lower frame rate (e.g., for 60 fps, 1 out of every 16 frames, for 120 fps, 1 out of 8, and 240 fps, 1 out of 4). As the number of frames is smaller, the computational load required for motion detection may be reduced in the motion detection module 340. According to various embodiments, the image extraction module 310 may determine the number of frames to be extracted, based on at least one of a situation of the memory 130 (remaining capacity, or speed, among others), a user setting, or a movement situation.

If the output video is a Full High Definition (FHD) video (resolution: 1920*1080), the image extraction module 310 may extract a High Definition (HD) video (resolution: 1280*720) from the output video. If the output video is a UHD video (resolution: 3840*2160), the image extraction module 310 may extract an HD video (resolution: 1280*720) from the output video. Alternatively, the image extraction module 310 may extract at least one of a VGA video (resolution: 640*480), a WVGA video (800*480), a PAL video (768*576), an SVGA video (800*600), and an XGA video (1024*768) from the output video. The resolution described above is intended only as an example, and the resolution may be applied in various ways. As the resolution is lower, the computational load on the processor 120 may be reduced. According to various embodiments, the image extraction module 310 may determine the resolution to be extracted, based on at least one of a situation of the memory 130, a user setting, or a movement situation.

The display 320 (e.g., the display device 160 in FIG. 1) may display a video (e.g., a preview video) obtained from the image extraction module 310. The display 320 may display the video in a preview form. The obtained video may have a lower frame rate than the video output from the image sensor 230. For example, the obtained video may have a selected lower frame rate, and the video output from the image sensor 230 may have a selected higher frame rate.

The buffer 330 (or a buffer memory) may temporarily store at least a portion of a video processed by the ISP 260. For example, the buffer 330 may store a video corresponding to a predetermined time. The predetermined time may be determined according to the performance of the buffer 330. Alternatively, the predetermined time may be configured as an optimal time for producing a slow motion video, based on the performance of the buffer 330. For example, a video of at least 1 to 2 seconds may be required in order to produce a slow motion video. The buffer 330 may delete a stored video in a first-in first-out (FIFO) manner. The buffer 330 may provide a stored video to the synchronization module 350. The buffer 330 may provide a stored video if a request is received from the synchronization module 350. The buffer 330 may be the same as or similar to the memory 250 in FIG. 2. According to an embodiment, the buffer 330 may be configured as at least a part of the memory 130 or a separate memory operated independently from the memory 130.

The motion detection module 340 may detect motion with respect to the video obtained from the image extraction module 310. The motion may denote the movement of an object (e.g., a subject) included in the obtained video. The motion detection module 340 may detect the degree of motion (or the difference in the motion) between the frames included in the obtained video. The degree of motion may be an optical flow that extracts the magnitude and direction of movement of a feature point by comparing feature points. The obtained video may have a lower frame rate or a lower resolution than the video output from the image sensor 230. The motion detection module 340 may identify the degree of occurrence of motion between a small number of frames, thereby reducing the amount of computation required to identify the degree of occurrence of motion. Alternatively, the motion detection module 340 may identify the degree of occurrence of motion for some areas between the frames. As the size of the area used for the degree of occurrence of motion is smaller, the computational load required for motion detection may be reduced. The motion detection module 340 may control the size of the extracted area, based on the minimum area necessary to detect the degree of occurrence of motion. According to various embodiments, the motion detection module 340 may determine the size of the area to be extracted, based on at least one of a situation of the memory 130, a user setting, or a movement situation.

The motion detection module 340 may determine (or identify) whether or not the identified degree of occurrence of motion is equal to or greater than (or exceeds) a reference value. The reference value may be set as default in the electronic device 101, or may be changed by user setting. For example, in the case where the reference value is 50, if the degree of occurrence of motion between the first frame and the second frame is 30, the motion detection module 340 may determine that the degree of occurrence of motion is low (or that there is no motion). If the degree of occurrence of motion between the second frame and the third frame is 60, the motion detection module 340 may determine that the degree of occurrence of motion is high (or that there is a motion). If the degree of occurrence of motion is greater than or equal to a reference value, the motion detection module 340 may transmit (or provide) a notification to the synchronization module 350 or the frame conversion module 360. In certain embodiments, motion estimation can be performed as set forth in compression standards such as MPEG, and resultant motion vectors can be used determine the degree of motion. According to various embodiments, the motion detection module 340 may transmit a frame (or an identifier of the frame) having a degree of occurrence of motion equal to or greater than a reference value to the synchronization module 350 or the frame conversion module 360. Hereinafter, the frame in which the degree of occurrence of motion is equal to or greater than a reference value will be referred to as a "motion detection frame".

According to various embodiments, the motion detection module 340 may check the amount of detection of motion, based on the frame at the time at which a shooting button is selected according to user input. For example, if the frame at the time at which a shooting button is selected is the $1000^{th}$ frame, the motion detection module 340 may check the amount of detection of motion before and after the $1000^{th}$ frame. The motion detection module 340 may determine a slow motion video production time, based on the amount of detection of motion. The amount of detection of motion before and after the $1000^{th}$ frame may be compared with the amount of detection of motion of the motion detection frame detected according to the degree of occurrence of motion between the frames. As a result of the comparison, the motion detection module 340 may determine a frame having a large amount of detection of motion to be a slow motion video time. The motion detection module 340 may provide the slow motion video time to the synchronization module 350.

The synchronization module 350 determines the frames from the selected higher rate video that correspond to the motion detection frame. In certain embodiments, the frames may have a time stamp, and the synchronization module 350 may examine the time stamps. The synchronization module 350 may serve to synchronize the time between frames. The synchronization module 350 may obtain a video (a plurality of frames) from the buffer 330, based on the frame (e.g., the motion detection frame) obtained from the motion detection module 340. According to various embodiments, the synchronization module 350 may obtain a video (a plurality of frames) from the buffer 330, based on the slow motion video time. According to various embodiments, the synchronization module 350 may store a video in a normal shooting mode (e.g., a selected lower frame rate), a video in a slow motion shooting mode (e.g., a selected higher frame rate), and videos before and after the motion detection frame. The buffer 330 may store the video output from the ISP 260 in real time, and it may take time for the motion detection module 340 to detect the motion. A time delay with respect to the video stored in the buffer 330 may occur due to the time required for detection of the motion. For example, 1500 frames may be stored in the buffer 330, and the frame in which motion is detected may be the $900^{th}$ frame. The synchronization module 350 may obtain a video from the buffer 330 in real time, and may identify frames before and after the motion detection frame in the obtained video. The synchronization module 350 may synchronize the time of the motion detection frame, based on the frame obtained from the buffer 330. The synchronization module 350 may synchronize the time between the frame obtained from the buffer 330 and the motion detection frame. The synchronization module 350 may provide a frame (or a plurality of frames) obtained from the buffer 330 to the frame conversion module 360.

The frame conversion module 360 may serve to convert a frame rate. The frame conversion module 360 may obtain the motion detection frame from the motion detection module 340. The frame conversion module 360 may obtain a frame before the motion detection frame or after the motion detection frame from the synchronization module 350. For example, in order to produce a slow motion video, at least 500 to 1000 interpolation frames may be required before and after the time at which the motion is detected. The number of produced interpolation frames (or videos) may be determined based on the number of frames of the slow motion video. The number of produced interpolation frames may be set based on settings of the electronic device 101 or a user setting. For example, the number of produced interpolation frames may be set between 500 and 2000. The frame conversion module 360 may produce interpolation frames, based on the set number of interpolation frames.

The frame conversion module 360 may produce the interpolation frames, based on the frame obtained from the synchronization module 350 or based on the motion detection frame. For example, if the motion detection frame is the $900^{th}$ frame, the frame conversion module 360 may produce a first interpolation frame, based on the $860^{th}$ and $861^{st}$ frames, and may produce a second interpolation frame, based on the $861^{st}$ and $862^{nd}$ frames, which precede the $900^{th}$ frame, among the frames obtained from the synchronization module 350. The frame conversion module 360 may insert the first interpolation frame between the $860^{th}$ frame and the $861^{st}$ frame, and may insert the second interpolation frame between the $861^{st}$ frame and the $862^{nd}$ frame, thereby producing a slow motion video.

Alternatively, the frame conversion module 360 may produce a first interpolation frame, based on the $900^{th}$ frame, which is a motion detection frame, and the $901^{st}$ frame, and may produce a second interpolation frame, based on the 901st and $902^{nd}$ frames. The frame conversion module 360 may insert the first interpolation frame between the $900^{th}$ frame and the $901^{st}$ frame, and may insert the second interpolation frame between the $901^{st}$ frame and the $902^{nd}$ frame, thereby producing a slow motion video.

According to various embodiments, the frame conversion module 360 may produce the slow motion video by repeating the operation of producing and inserting the interpolation frames before and after the $900^{th}$ frame, which is the motion detection frame. The frame conversion module 360 may produce an interpolation frame (or video), based on a general method of producing interpolation videos. Since the method of producing the interpolation frame is well known, a detailed description thereof will be omitted. The frame conversion module 360 may provide the produced slow motion video to the encoder 370. According to various embodiments, the frame conversion module 360 may insert an interpolation video into the video output from the ISP 260, thereby producing a slow motion video having a higher frame rate than the video output from the ISP 260. For example, in the case where the video output from the ISP 260 has a frame rate of 240 fps, the slow motion video may have a frame rate of 960 fps. Alternatively, in the case where the video output from the ISP 260 has a frame rate of 960 fps, the slow motion video may have a frame rate of 2 kfps or 4 kfps.

The encoder 370 may encode the slow motion video. The encoder 370 may compress and encode the slow motion video. The encoder 370 may convert the slow motion video into coded data according to a compression scheme specified in the electronic device 101 {e.g., moving picture experts group (MPEG)} or a user setting. The encoder 370 may store the compressed and encoded slow motion video in the memory 130.

FIG. 3B may be a second configuration diagram of an electronic device.

In the foregoing embodiment, the image extraction module 310 and the buffer 330 receive the video from the image sensor 230 directly.

Referring to FIG. 3B, an electronic device (e.g., the electronic device 101 in FIG. 1) according to various embodiments may produce a slow motion video, based on the degree of occurrence of motion between frames or user input. The electronic device 101 may include an image sensor 230, an ISP 260, an image extraction module 310, a display 320, a buffer 330, a motion detection module 340, a synchronization module 350, a frame conversion module 360, and an encoder 370. The image extraction module 310, the buffer 330, the motion detection module 340, the synchronization module 350, and the frame conversion module 360 may be included, as hardware modules or software modules, in a processor (e.g., the processor 120 in FIG. 1) including a processing circuit.

The image sensor 230 may convert the light emitted or reflected by a subject and transmitted through a lens assembly 210 into an electrical signal, thereby obtaining an image corresponding to the subject. Since the image sensor 230 is the same as or similar to that shown in FIG. 3A, a detailed description thereof will be omitted.

The image extraction module 310 may extract a partial video from the video output (or obtained) from the image sensor 230. The image extraction module 310 may selectively extract a partial video from the video (e.g., selected higher frame rate) processed according to the performance of the image sensor 230. The partial video from the video may represent a down-sampling of the video to the display rate in certain embodiments. The image extraction module 310 may provide the extracted video to the motion detection module 340 or the ISP 260. For example, the image extraction module 310 may provide the ISP 260 with a video obtained from the image sensor 230 without any processing (e.g., bypass). That is, the image extraction module 310 may provide the ISP 260 with a video obtained from the image sensor 230 without any processing, regardless of a shooting mode (e.g., a normal shooting mode or a slow motion shooting mode). The image extraction module 310 may extract some frames or a video having a low resolution from the video obtained from the image sensor 230, and may provide the same to the motion detection module 340. Since the image extraction module 310 is the same as or similar to that shown in FIG. 3A, a detailed description thereof will be omitted.

The buffer 330 may temporarily store at least a portion of a video output (or obtained) from the image sensor 230. For example, the buffer 330 may store a video corresponding to a predetermined time. The predetermined time may be determined according to the performance of the buffer 330. Since the buffer 330 is the same as or similar to that shown in FIG. 3A, a detailed description thereof will be omitted.

The ISP 260 may process one or more images with respect to the video obtained from the image extraction module 310 or the video stored in the memory 130. The processed video may be provided to the display 320. The ISP 260 may process a video to conform to the performance of the display 320 (or a display environment), and may provide the same to the display 320. Since the ISP 260 is the same as or similar to that shown in FIG. 3A, a detailed description thereof will be omitted.

The display 320 may display the video obtained from the ISP 260. The display 320 may display the video in a preview form. Since the display 320 is the same as or similar to that shown in FIG. 3A, a detailed description thereof will be omitted.

The motion detection module 340 may detect motion with respect to the video obtained from the image extraction module 310. The obtained video may have a lower frame rate or a lower resolution than the video output from the image sensor 230. The motion detection module 340 may detect the degree of occurrence of motion (or the difference in the motion) between the frames included in the obtained video. Since the motion detection module 340 is the same as or similar to that shown in FIG. 3A, a detailed description thereof will be omitted.

The synchronization module 350 may serve to synchronize the time between frames. The synchronization module 350 may obtain a video (a plurality of frames) from the buffer 330, based on the frame (e.g., the motion detection frame) obtained from the motion detection module 340. Since the synchronization module 350 is the same as or similar to that shown in FIG. 3A, a detailed description thereof will be omitted.

The frame conversion module 360 may serve to convert a frame rate. The frame conversion module 360 may obtain the motion detection frame from the motion detection module 340. The frame conversion module 360 may obtain a frame before a motion detection frame or after a motion detection frame from the synchronization module 350. Since the frame conversion module 360 is the same as or similar to that shown in FIG. 3A, a detailed description thereof will be omitted.

The encoder 370 may encode the slow motion video. The encoder 370 may compress and encode the slow motion video. The encoder 370 may store the compressed and encoded slow motion video in the memory 130. Since the encoder 370 is the same as or similar to that shown in FIG. 3A, a detailed description thereof will be omitted.

FIG. 3C may be a third configuration diagram of an electronic device.

Referring to FIG. 3C, an electronic device (e.g., the electronic device 101 in FIG. 1) according to various embodiments may produce a slow motion video, based on user input. The electronic device 101 may include an image sensor 230, an ISP 260, a display 320, a buffer 330, a synchronization module 350, a frame conversion module 360, and an encoder 370.

In FIG. 3C, the synchronization module 350 obtains the video from the buffer 330. The image sensor 230 may convert the light emitted or reflected by a subject and transmitted through a lens assembly 210 into an electrical signal, thereby obtaining an image corresponding to the subject. Since the image sensor 230 is the same as or similar to that shown in FIG. 3A, a detailed description thereof will be omitted.

The ISP 260 may process one or more images with respect to the video obtained through the image sensor 230. The processed video may be provided to the buffer 330 and the display 320. The ISP 260 may process a video to conform to the performance of the display 320 (or a display environment), and may provide the same to the display 320. Since the ISP 260 is the same as or similar to that shown in FIG. 3A, a detailed description thereof will be omitted.

The buffer 330 may temporarily store at least a portion of the video processed by the ISP 260. For example, the buffer 330 may store a video corresponding to a predetermined time. The predetermined time may be determined according to the performance of the buffer 330. Since the buffer 330 is the same as or similar to that shown in FIG. 3A, a detailed description thereof will be omitted.

The display 320 may display the video obtained from the ISP 260. The display 320 may display the video in a preview form. Since the display 320 is the same as or similar to that shown in FIG. 3A, a detailed description thereof will be omitted.

The synchronization module 350 may serve to synchronize the time between frames. The synchronization module 350 may obtain a video (i.e., a plurality of frames) from the buffer 330. Since the synchronization module 350 is the same as or similar to that shown in FIG. 3A, a detailed description thereof will be omitted.

The frame conversion module 360 may serve to convert a frame rate. If user input for obtaining a slow motion video (e.g., selection of a shooting button) is detected through an input device (e.g., the input device 150 in FIG. 1), the frame conversion module 360 may obtain a frame for producing a slow motion video from the synchronization module 350. For example, the frame conversion module 360 may obtain, from the synchronization module 350, a frame before or after the time at which the user input is detected.

For example, if user input is detected at the $900^{th}$ frame, the frame conversion module 360 may produce a first interpolation frame, based on the $860^{th}$ and $861^{st}$ frames, and may produce a second interpolation frame, based on the $861^{st}$ and $862^{nd}$ frames, which precede the $900^{th}$ frame, among the frames obtained from the synchronization module 350. The frame conversion module 360 may insert the first interpolation frame between the $860^{th}$ frame and the $861^{st}$ frame, and may insert the second interpolation between the $861^{st}$ frame and the $862^{nd}$ frame, thereby producing a slow motion video.

Alternatively, if user input is detected in the $900^{th}$ frame, the frame conversion module 360 may produce a first interpolation frame, based on the $930^{th}$ and $931^{st}$ frames, and may produce a second interpolation frame, based on the $931^{st}$ and $932^{nd}$ frames, which are posterior to the $900^{th}$ frame. The frame conversion module 360 may insert the first interpolation frame between the $930^{th}$ frame and the $931^{st}$ frame, and may insert the second interpolation between the $931^{st}$ frame and the $932^{nd}$ frame, thereby producing a slow motion video. Since the frame conversion module 360 is the same as or similar to that shown in FIG. 3A, a detailed description thereof will be omitted.

The encoder 370 may encode the slow motion video. The encoder 370 may compress and encode the slow motion video. The encoder 370 may store the compressed and encoded slow motion video in the memory 130. Since the encoder 370 is the same as or similar to that shown in FIG. 3A, a detailed description thereof will be omitted.

FIG. 3D may be a fourth configuration diagram of an electronic device.

In FIG. 3D, the operations of the image extraction module 310, motion detection module 340, synchronization module 350 and frame conversion module 360 can be performed on a server 108, thereby offloading the computation load of the foregoing from the electronic device 101.

Referring to FIG. 3D, an electronic device (e.g., the electronic device 101 in FIG. 1) according to various embodiments may produce a slow motion video, based on user input. The electronic device 101 may include an image sensor 230, an ISP 260, a display 320, a communication module 190, a memory 130, and a decoder 380.

The image sensor 230 may convert the light emitted or reflected by a subject and transmitted through a lens assembly 210 into an electrical signal, thereby obtaining an image corresponding to the subject. Since the image sensor 230 is the same as or similar to that shown in FIG. 3A, a detailed description thereof will be omitted.

The communication module (e.g., the communication module 190 in FIG. 1) may transmit a video output from the image sensor 230 to a server (e.g., the server 108 in FIG. 1) if user input (e.g., selection of a shooting button) for obtaining a slow motion video is detected through the input device 150. The communication module 190 may receive, from the server 108, a slow motion video with respect to the output video.

The server 108 may produce a slow motion video by detecting motion with respect to the output video. The server 108 may play the roles of the image extraction module 310, the buffer 330, the motion detection module 340, the synchronization module 350, and the frame conversion module 360 shown in FIG. 3A, thereby producing a slow motion video. The server 108 may provide the produced slow motion video to the electronic device 101.

The memory 130 may store the received slow motion video.

The ISP 260 may process one or more images with respect to the video obtained through the image sensor 230 or the video stored in the memory (e.g., the memory 130 in FIG. 1). The processed video may be provided to the display 320. The ISP 260 may process a video to conform to the performance of the display 320 (or a display environment), and may provide the same to the display 320. Since the ISP 260 is the same as or similar to that shown in FIG. 3A, a detailed description thereof will be omitted.

The display 320 may display the video (e.g., the slow motion video) obtained from the ISP 260 or the decoder 380. The display 320 may display the slow motion video in a preview form. Since the display 320 is the same as or similar to that shown in FIG. 3A, a detailed description thereof will be omitted.

The decoder 380 may decode the slow motion video. The decoder 370 may decode the slow motion video stored in the memory 130.

An electronic device (e.g., the electronic device 101 in FIG. 1) according to various embodiments may include: a camera (e.g., the camera module 180 in FIG. 1) including an image signal processor (e.g., the image signal processor 260 in FIG. 2) configured to process a video output from an image sensor (e.g., the image sensor 230 in FIG. 2); a memory (e.g., the memory 130 in FIG. 1); and a processor (e.g., the processor 120 in FIG. 1), wherein the processor may be configured to: obtain the processed video from the image signal processor; extract a portion of the obtained video to detect motion; synchronize the obtained video with the extracted video, based on the motion detection; produce a slow motion video by converting a frame rate of the synchronized video; and encode the produced slow motion video and store the same in the memory.

The processor may be configured to detect the motion while displaying the video processed by the image signal processor on a display (e.g., the display device 160 in FIG. 1).

The processor may be configured to, if user input for selecting a shooting button is detected in a slow motion shooting mode, or if the degree of occurrence of motion between frames included in the video extracted in the slow motion shooting mode is greater than or equal to a reference value, synchronize the obtained video with the extracted video.

The processor may be configured to extract some frames from among a plurality of frames included in the obtained video and identify whether the degree of occurrence of motion between frames is greater than or equal to a reference value, based on the extracted frames.

The processor may be configured to determine the number of frames to be extracted, based on at least one of a situation of the memory, a user setting, or a movement situation.

The processor may be configured to extract a video having a lower resolution than the obtained video and identify whether a degree of occurrence of motion between frames included in the extracted video is greater than or equal to a reference value.

The processor may be configured to determine the resolution to be extracted, based on at least one of a situation of the memory, a user setting, or a movement situation.

The processor may be configured to produce the slow motion video, based on a motion detection frame in which the degree of occurrence of motion between frames included in the video is greater than or equal to a reference value.

The processor may be configured to obtain a plurality of frames before the motion detection frame or a plurality of frames after the motion detection frame, produce interpolation frames, based on the obtained plurality of frames, and insert the produced interpolation frames into the plurality of frames to produce the slow motion video.

The processor may be configured to produce the slow motion video by synchronizing the time between the motion detection frame and the plurality of frames before and after the motion detection frame.

The processor may be configured to identify the amount of motion detection at the time at which user input for producing the slow motion video occurs, determine a slow motion video production time, based on the amount of motion detection, and produce the slow motion video, based on the slow motion video production time.

The processor may be configured to compare a first amount of motion detection at the time at which the user input for producing the slow motion video occurs with a second amount of motion detection of the motion detection frame detected according to the degree of occurrence of motion between frames included in the video and determine the slow motion video production time, based on the comparison result.

The processor may be configured to, if the second amount of motion detection is greater than the first amount of motion detection, determine a detection time of the motion detection frame to be the slow motion video production time.

Figure 4:
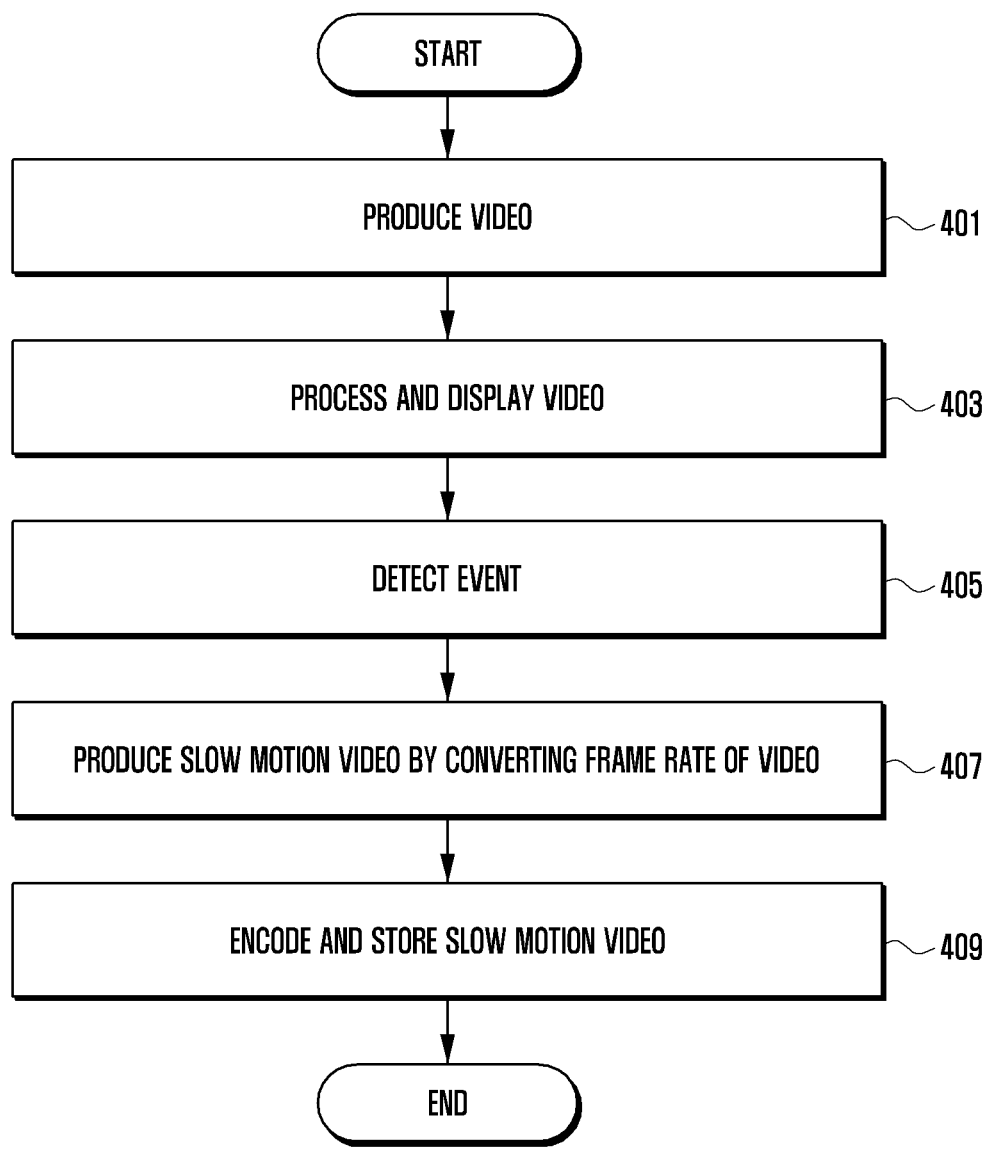
FIG. 4 is a flowchart illustrating a method of operating an electronic device according to various embodiments.

FIG. 4 is a flowchart illustrating a method of operating an electronic device according to various embodiments.

Referring to FIG. 4, in operation 401, a processor (e.g., the processor 120 in FIG. 1) of an electronic device (e.g., the electronic device 101 in FIG. 1) according to various embodiments may produce a video. The processor 120 may execute a camera application, based on user input, and may drive a camera (e.g., the camera module 180 in FIG. 1) using the executed camera application. The processor 120 may obtain a video using the driven camera module 180. For example, the video may be produced by an image sensor (e.g., the image sensor 230 in FIG. 2). For example, the video may be selected higher frame rate video according to the performance of the image sensor 230.

In operation 403, the processor 120 (e.g., the image signal processor 260 in FIG. 2) may process and display (or output) a video. The processor 120 may process the video output from the image sensor 230 through the image signal processor 260. The processor 120 may perform processes, such as noise removal, tone adjustment, decimation/down sampling to the selected lower frame rate video, and video interpolation, on the output video. The processor 120 may display the processed video through a display (e.g., the display device 160 in FIG. 1), and may output sound related to the processed video through a speaker (e.g., the audio output device 155 in FIG. 1).

In operation 405, the processor 120 (e.g., the motion detection module 340 in FIG. 3) may detect an event. The event may be a trigger signal for obtaining a slow motion video. The trigger signal may be at least one of user input or motion detection. The processor 120 may detect the event while outputting the video. For example, the processor 120 may set the shooting mode to a "slow motion (or super slow motion) shooting mode" in the camera application, and, if a shooting button is selected through an input device (e.g., the input device 150 in FIG. 1), may identify that user input for obtaining a slow motion video has been detected. The processor 120 may set the shooting mode to a "slow motion (or super slow motion) shooting mode" in the camera application, and may identify whether or not the degree of occurrence of motion between frames is greater than or equal to a reference value, based on a partial video extracted from the video processed by the ISP 260. The partial video may have a lower frame rate or a lower resolution than the video stored in a buffer (e.g., the buffer 330 in FIG. 3). If a video in which the degree of occurrence of motion is greater than or equal to a reference value is identified, the processor 120 may identify that a motion for obtaining a slow motion video has been detected.

In operation 407, the processor 120 (e.g., the frame conversion module 360 in FIG. 3) may produce a slow motion video by converting the frame rate of the video. The video may be a video processed by the ISP 260. The processor 120 may synchronize a video stored in the buffer 330, which has the selected higher frame rate, based on the motion detection frame. Since it takes time to detect the motion, there may be a mismatch in time between the video stored in the buffer 330 and the motion detection frame. The processor 120 may synchronize the time between the motion detection frame and the video stored in the buffer 330. The processor 120 may produce an interpolation video with respect to the synchronized video, based on the motion detection frame. The interpolation video may be produced based on frames before and after the motion detection frame. The number of interpolation videos to be produced may be determined based on the number of frames of the slow motion video. The number of interpolation videos to be produced may be configured based on settings of the electronic device 101 or a user setting. For example, the processor 120 may produce a large number of interpolation videos if many frames are required for the slow motion video (e.g., 100 frames), and may produce a small number of interpolation videos if few frames are required for the slow motion video (e.g., 50 frames).

In operation 409, the processor 120 (e.g., the encoder 370 in FIG. 3) may encode and store the slow motion video. The processor 120 may convert the slow motion video into coded data according to the compression scheme specified in the electronic device 101 or according to a user setting. The processor 120 may store the compressed and encoded slow motion video in the memory 130.

Figure 5:
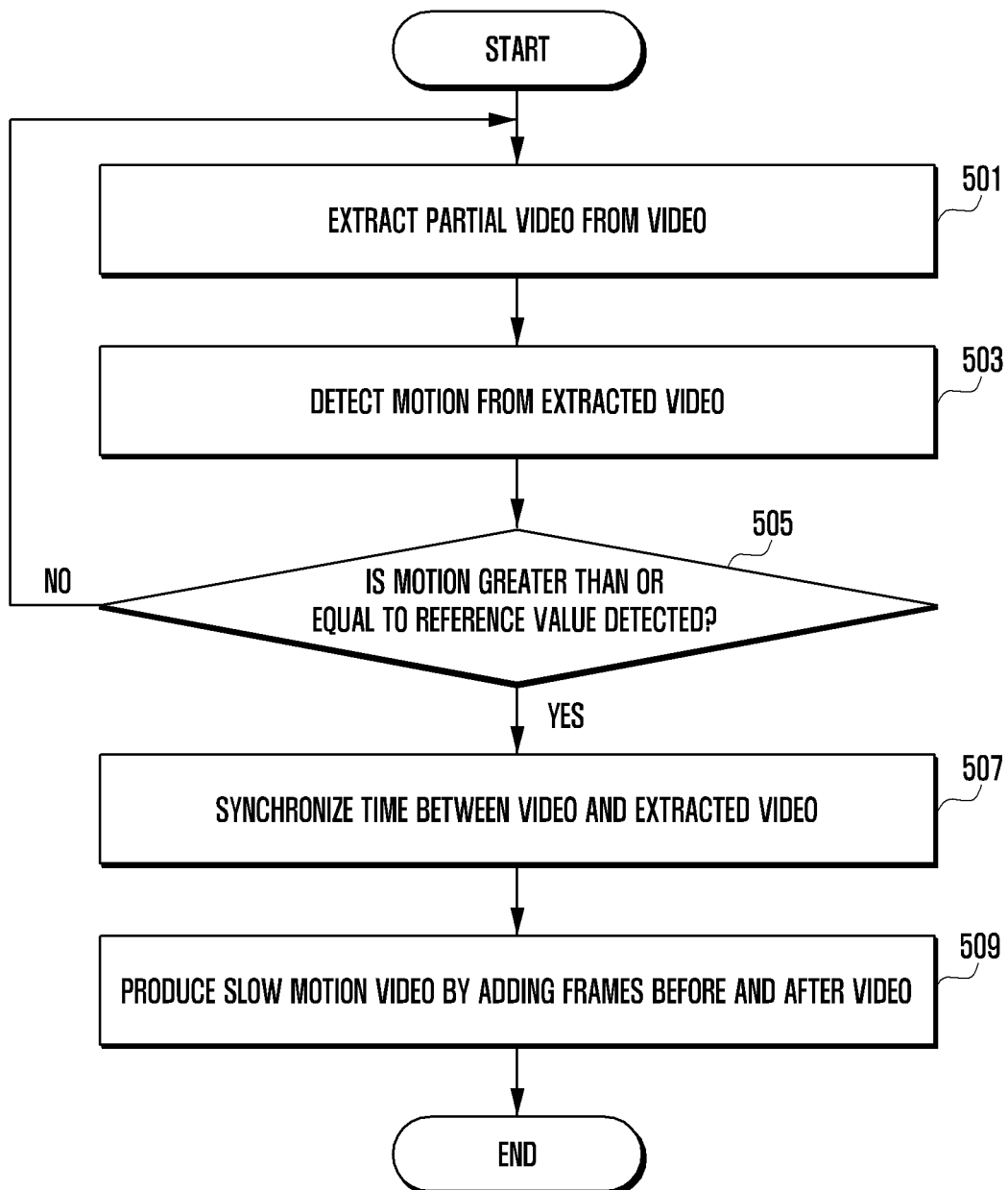
FIG. 5 is a flowchart illustrating a method of producing a slow motion video through motion detection in an electronic device according to various embodiments.

FIG. 5 is a flowchart illustrating a method of producing a slow motion video through motion detection in an electronic device according to various embodiments.

Referring to FIG. 5, in operation 501, a processor (e.g., the processor 120 in FIG. 1) of an electronic device (e.g., the electronic device 101 in FIG. 1) according to various embodiments may extract a partial video from a video. The processor 120 (e.g., the image extraction module 310 in FIG. 3) may extract a partial video from the video processed by an image signal processor (e.g., the image signal processor 260 in FIG. 2). The video may be a video output from the image sensor (e.g., the image sensor 230 in FIG. 3) in a slow motion shooting mode and processed by the image signal processor 260. The video obtained in the slow motion shooting mode may have a different frame rate from that of the video obtained in a normal shooting mode. Since the slow motion video requires more frames than the normal video, the image sensor 230 may output the video having a frame rate conforming to the slow motion video. The processor 120 may extract a partial video from the video (e.g., the video obtained to obtain a slow motion video) for motion detection. According to various embodiments, the processor 120 may extract some frames or a video having a low resolution from the video.

The larger the number of frames or the higher the resolution, the more computation is required for motion detection. Therefore, the processor 120 may determine the number of frames to be extracted or the resolution to be extracted according to the current state (or situation) of the electronic device 101. According to various embodiments, the processor 120 may determine the number of frames to be extracted or the resolution to be extracted according to at least one of a situation of a memory (e.g., the memory 130 in FIG. 1) of the electronic device 101, a user setting, or a movement situation. For example, if the electronic device 101 uses 70% of the memory 130, the processor 120 may reduce the number of frames (e.g., 30 fps) and the resolution so as to use only 30% of the memory. Alternatively, if the electronic device 101 uses 30% of the memory 130, the processor 120 may increase the number of frames (e.g., 240 fps) and the resolution so as to use only 70% of the memory. Alternatively, the processor 120 may increase the number of frames as the motion value of the current video becomes higher, and may reduce the number of frames as the motion value of the current video becomes lower.

The processor 120 may determine the number of frames to be extracted or the resolution to be extracted, based on the situation of the memory 130. The processor 120 may determine the number of frames to be extracted or the resolution to be extracted, based on a user setting. The processor 120 may determine the number of frames to be extracted or the resolution to be extracted, based on a movement situation. The processor 120 may determine the number of frames to be extracted or the resolution to be extracted, based on a situation of the memory 130 and a user setting. The processor 120 may determine the number of frames to be extracted or the resolution to be extracted, based on a situation of the memory 130 and a movement situation. The processor 120 may determine the number of frames to be extracted or the resolution to be extracted, based on a movement situation and a user setting. The processor 120 may determine the number of frames to be extracted or the resolution to be extracted in consideration of all of the situation of the memory 130, the user setting, and the movement situation In operation 503, the processor 120 (e.g., the motion detection module 340) may detect motion from the extracted video. The processor 120 may identify the degree of occurrence of motion between the frames included in the extracted video. For example, the processor 120 may detect motion of an object (or subject) such as throwing a ball, a bouncing ball, a popping balloon, or a car passing at a high speed. The processor 120 may identify the degree of occurrence of motion for an object having a predetermined size or more in the frame. The processor 120 may ignore the degree of occurrence of motion for an object of a small size (e.g., insects), and may identify the degree of occurrence of motion for an object having a predetermined size or more. The processor 120 may identify the degree of occurrence of motion between adjacent frames, such as the difference between a first frame and a second frame, the difference between a second frame and a third frame, or the difference between a fifth frame and a tenth frame, or the degree of occurrence of motion between a predetermined number of frames or less (e.g., 5 frames or 10 frames).

In operation 505, the processor 120 (e.g., the motion detection module 340) may determine whether motion equal to or greater than a reference value is detected. The reference value may be configured by a setting of the electronic device 101 or a user setting. Alternatively, the reference value may be variably configured according to the movement situation. The processor 120 may perform operation 507 if a motion equal to or greater than a reference value is detected, and may return to operation 501 if a motion equal to or greater than a reference value is not detected. After returning to operation 501, the processor 120 may repeat operations 501 to 505 to thus determine whether or not a motion is detected from the video obtained from the camera (e.g., the video output through the image sensor 230 and the image signal processor 260).

If motion equal to or greater than a reference value is detected, the processor 120 (e.g., the synchronization module 350) may synchronize the time between the video and the extracted video in operation 507. The video may be stored in a buffer (e.g., the buffer 330 in FIG. 3) to then be displayed on the display 330. The buffer 330 stores a video (e.g., a plurality of frames) corresponding to a predetermined time in order to produce a slow motion video. However, since it takes time to detect motion, the processor 120 may synchronize the time between the videos (or frames) before and after the motion detection frame, based on a frame (e.g., a motion detection frame) in which a motion equal to or greater than a reference value is detected. For example, in the case where 2000 frames are stored in the buffer 330 and the motion detection frame is the 900th frame, the processor 120 may synchronize frames preceding the $900^{th}$ frame by 500 frames to the frame following the $900^{th}$ frame by 500 frames with the $900^{th}$ frame.

In operation 509, the processor 120 (e.g., the frame conversion module 360) may produce a slow motion video by adding frames before and after the video. For example, the processor 120 may produce a slow motion video using frames before and after the time at which the motion is detected for a natural video. In the case where the motion detection frame is the 900$^{th}$ frame, the processor 120 may produce a slow motion video, based on the 700$^{th}$ frame to the 1500$^{th}$ frame. The processor 120 may produce a first interpolation frame, based on the 700$^{th}$ frame and the 701$^{st}$ frame, and may produce a second interpolation frame, based on the 705$^{th}$ frame to the 710$^{th}$ frame. The processor 120 may produce a slow motion video by producing and inserting the interpolation frames between the 700$^{th}$ frame and the 1500$^{th}$ frame in the above manner.

Figure 6:
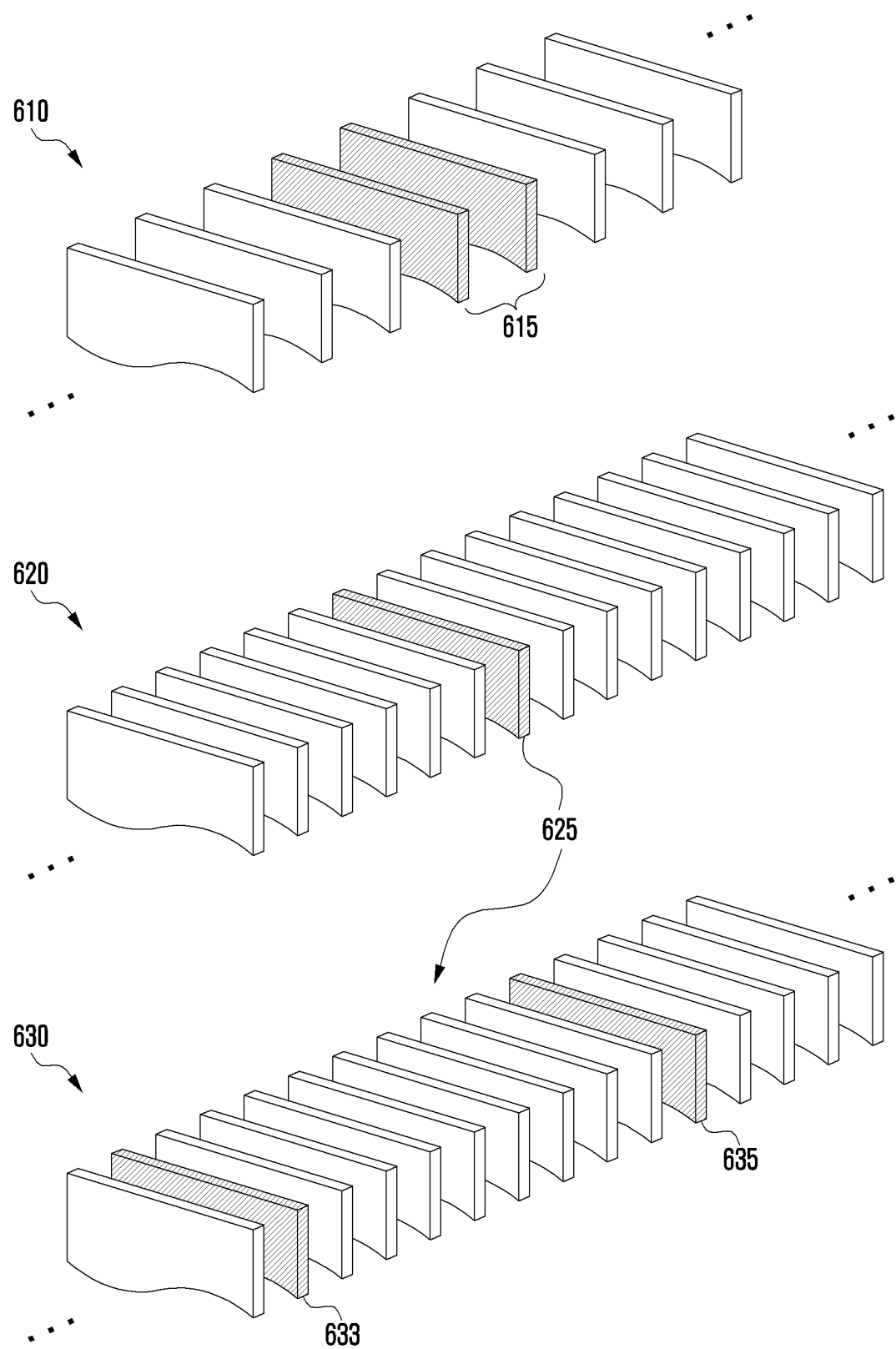
FIG. 6 is a diagram illustrating an example of synchronizing a video according to various embodiments.

FIG. 6 is a diagram illustrating an example of synchronizing a video according to various embodiments.

Referring to FIG. 6, a processor (e.g., the processor 120 in FIG. 1) of an electronic device (e.g., the electronic device 101 in FIG. 1) according to various embodiments may store videos having different frame rates. A first video 610 may be a video (e.g., 30 fps or 60 fps) captured in a normal shooting mode. A second video 620 may be a video (e.g., 240 fps, 960 fps) captured in a slow motion shooting mode, and may include a motion detection frame 625. A third video 630 may be a video obtained in real time from the buffer 330, and the processor 120 may identify a frame before and after returning upon detecting motion based on the third video 630.

If the first frame and the second frame 615 are converted to a 960 fps video in the first video 610, it may be the second video 620. The processor 120 may produce interpolation frames, based on the motion detection frame 625 included in the second video 620, and may insert the interpolation frames before and after the motion detection frame 625, thereby producing a slow motion video. The time of the motion detection frame 625 may be later than the third frame 633 and earlier than the fourth frame 635 in the third video 630. When producing the slow motion video, the processor 120 may include some frames (e.g., 20 frames) before the third frame 633 in the portion before the start of the slow motion video, and may include some frames (e.g., 20 frames) after the fourth frame 635 in the portion after the end of the slow motion video.

Figure 7:
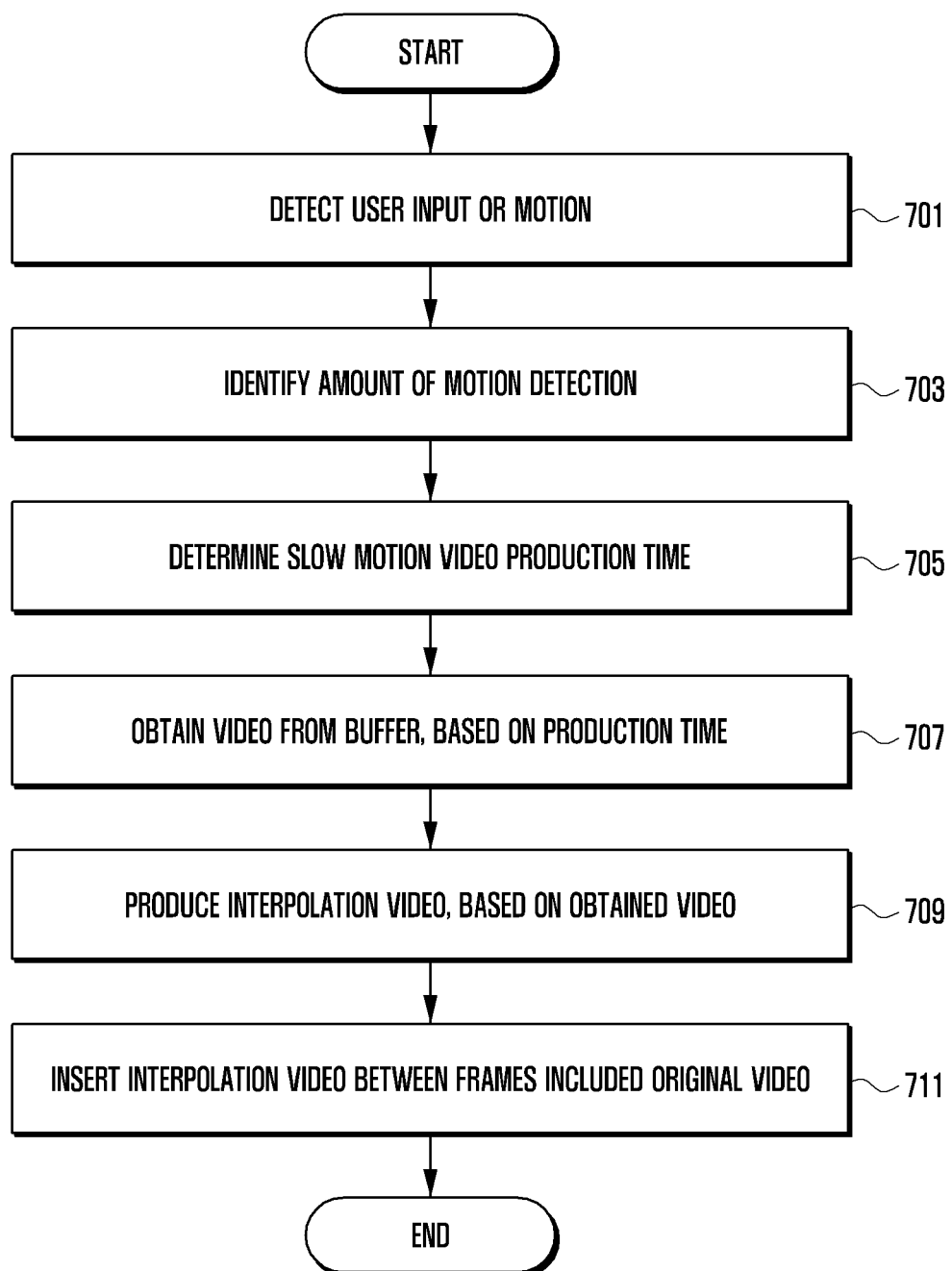
FIG. 7 is a flowchart illustrating a method of producing a slow motion video in an electronic device according to various embodiments.

FIG. 7 is a flowchart illustrating a method of producing a slow motion video in an electronic device according to various embodiments.

Referring to FIG. 7, in operation 701, a processor (e.g., the processor 120 in FIG. 1) of an electronic device (e.g., the electronic device 101 in FIG. 1) according to various embodiments may detect user input or motion. The processor 120 may detect the user input or motion while outputting a video through a display (e.g., the display device 160 in FIG. 1) or a speaker (e.g., the audio output device 155 in FIG. 1). The user input may be an input for selecting a shooting button by a user. For example, the processor 120 may set the shooting mode to a "slow motion (or super slow motion) shooting mode" in the camera application, and, if a shooting button displayed on the display 160 is selected, may identify that a user input for obtaining a slow motion video has been detected. The processor 120 may extract a partial video from the video processed by an image signal processor (e.g., the image signal processor 260 in FIG. 2), and if it is identified that the degree of occurrence of motion between the frames included in the extracted video is equal to or greater than a reference value, may identify that motion for obtaining a slow motion video has been detected. The partial video may have a lower frame rate or a lower resolution than the video stored in a buffer (e.g., the buffer 330 in FIG. 3). The user input detection and the motion detection may be performed separately from each other, or may be performed at the same time.

In operation 703, the processor 120 (e.g., the motion detection module 340) may check the amount of motion detection. The processor 120 may check the amount of motion detection, based on the frame at the time at which a shooting button is selected according to user input. For example, in the case where the frame at the time at which the shooting button is selected is the 1000$^{th}$ frame, the processor 120 may check the amount of motion detection before and after the 1000$^{th}$ frame. The processor 120 may check whether the amount of motion detection is greater than or equal to a reference value.

In operation 705, the processor 120 (e.g., the motion detection module 340) may determine (or identify) a slow motion video production time. The processor 120 may determine the slow motion video production time, based on the amount of motion detection. For example, the processor 120 may determine whether or not the amount of motion detection before and after the 1000$^{th}$ frame is greater than or equal to a reference value at the time at which the shooting button is selected. The processor 120 may compare the amount of motion detection before and after the 1000$^{th}$ frame with the amount of motion detection of a motion detection frame detected according to the degree of occurrence of motion between frames. As a result of the comparison, the processor 120 may determine a frame having a large amount of motion detection as a slow motion video time.

According to various embodiments, the amount of motion detection may not be large for the frame at the time at which the user selects the shooting button. The processor 120 may perform operations 703 and 705, based on settings of the electronic device 101 or a user setting, thereby determining a motion detection frame. For example, if an "auto mode" is enabled during slow motion shooting, the processor 120 may perform operations 703 and 705. The frame at the time at which the shooting button is selected is the 1000$^{th}$ frame, and the frame in which the amount of motion detection is detected to be equal to or greater than a reference value (e.g., the motion detection frame) may be the 800$^{th}$ frame. In this case, the processor 120 may determine the 800$^{th}$ frame to be the slow motion video production time. Alternatively, the processor 120 may determine the 750$^{th}$ frame to be the video production time.

In operation 707, the processor 120 (e.g., the synchronization module 350 in FIG. 3) may obtain a video from a buffer (e.g., the buffer 330 in FIG. 3), based on the production time. The processor 120 may obtain a plurality of frames before and after the motion detection frame from the buffer 330. The processor 120 may synchronize the time between the motion detection frame and the video obtained from the buffer 330.

In operation 709, the processor 120 (e.g., the frame conversion module 360) may produce interpolation videos, based on the obtained video. In order to produce a slow motion video, at least 500 to 1000 interpolation frames may be required before and after the time at which motion is detected. The number of interpolation frames (or videos) to be produced may be determined based on the number of frames of the slow motion video. The number of interpolation frames to be produced may be set based on settings of the electronic device 101 or a user setting. For example, the processor 120 may produce a first interpolation frame, based on the 800$^{th}$ and 805$^{th}$ frames included in the obtained video, and may produce a second interpolation frame, based on the 806th and 810th frames included in the obtained video. One or more first interpolation frames and second interpolation frames may be produced. Since the interpolation video may be produced in any of various methods, a detailed description thereof may be omitted.

In operation 711, the processor 120 (e.g., the frame conversion module 360) may insert the interpolation videos between the frames included in the original video, thereby producing a slow motion video. The processor 120 may insert the first interpolation frame between the 800th frame and the 805th frame, and may insert the second interpolation frame between the 806th frame and the 810th frame, thereby producing a slow motion video.

A method of operating an electronic device (e.g., the electronic device 101 in FIG. 1) according to various embodiments may include: obtaining a video processed by an image signal processor (e.g., the image signal processor 260 in FIG. 2) included in a camera (e.g., the camera module 180 in FIG. 1) of the electronic device; extracting a portion of the obtained video to detect motion; synchronizing the obtained video with the extracted video; producing a slow motion video by converting a frame rate of the synchronized video, based on the detected degree of occurrence of motion; and encoding the produced slow motion video and storing the same in the memory of the electronic device.

The synchronizing may include synchronizing the obtained video with the extracted video if user input for selecting a shooting button is detected in a slow motion shooting mode, or if the degree of occurrence of motion between frames included in the video extracted in the slow motion shooting mode is greater than or equal to a reference value.

The method may further include: extracting some frames from among a plurality of frames included in the obtained video; identifying whether the degree of occurrence of motion between frames is greater than or equal to a reference value, based on the extracted frames; and synchronizing the obtained video with the extracted video if the degree of occurrence of motion between the frames is equal to or greater than a reference value.

The method may further include determining the number of frames to be extracted, based on at least one of a situation of the memory, a user setting, or a movement situation.

The method may further include: extracting a video having a lower resolution than the obtained video; identifying whether a degree of occurrence of motion between frames included in the extracted video is greater than or equal to a reference value; and synchronizing the obtained video with the extracted video if the degree of occurrence of motion between the frames is equal to or greater than a reference value.

The producing may include: obtaining a plurality of frames before the motion detection frame or a plurality of frames after the motion detection frame, based on a motion detection frame in which the degree of occurrence of motion between frames included in the video is equal to or greater than a reference value; producing an interpolation frame, based on the obtained plurality of frames; and inserting the produced interpolation frame into the plurality of frames to produce the slow motion video.

The synchronizing may include synchronizing time between the motion detection frame and the plurality of frames before or after the motion detection frame.

According to various embodiments, if an event is detected while outputting a preview video using a video output from an image sensor, it is possible to produce a slow motion video using the preview video.

According to various embodiments, it is possible to produce a slow motion video without mounting an additional component to the electronic device, which reduces costs.

The embodiments of the disclosure disclosed herein and shown in the drawings are merely specific examples presented in order to easily describe technical details of the disclosure and to help the understanding of the disclosure, and are not intended to limit the scope of the disclosure. Therefore, it should be construed that, in addition to the embodiments disclosed herein, all modifications and changes or modified and changed forms derived from the technical idea of the disclosure fall within the scope of the disclosure.

What is claimed is:

1. An electronic device comprising:
 a camera comprising an image signal processor configured to process a video output from an image sensor;
 a memory; and
 a processor, wherein the processor is configured to:
 obtain the processed video from the image signal processor;
 extract a portion of the obtained video to detect motion;
 synchronize the obtained video with the extracted video, based on the motion detection;
 produce a slow motion video by converting a frame rate of the synchronized video; and
 encode the produced slow motion video and store the same in the memory;
 produce the slow motion video, based on a motion detection frame in which a degree of occurrence of motion between frames included in the video is greater than or equal to a reference value;
 obtain a plurality of frames before the motion detection frame or a plurality of frames after the motion detection frame, produce interpolation frames, based on the obtained plurality of frames, and insert the produced interpolation frames into the plurality of frames to produce the slow motion video; and
 produce the slow motion video by synchronizing a time between the motion detection frame and the plurality of frames before and after the motion detection frame.

2. The electronic device of claim 1, further comprising a display,
 wherein the processor is configured to detect the motion while displaying the video processed by the image signal processor on the display.

3. The electronic device of claim 1, wherein the processor is configured to, if a user input for selecting a shooting button is detected in a slow motion shooting mode, or if a degree of motion between a frame and a subsequent frame included in the video extracted in the slow motion shooting mode is greater than or equal to a reference value, synchronize the obtained video with the extracted video, wherein the frames of the obtained video corresponding to the frame and the subsequent frame are identified.

4. The electronic device of claim 1, wherein the processor is configured to extract some frames from among a plurality of frames included in the obtained video and identify whether a degree of occurrence of motion between frames is greater than or equal to a reference value, based on the extracted frames.

5. The electronic device of claim 4, wherein the processor is configured to determine a number of frames to be extracted, based on at least one of a situation of the memory, a user setting, or a movement situation.

6. The electronic device of claim 1, wherein the processor is configured to extract a video having a lower resolution than the obtained video and identify whether a degree of occurrence of motion between frames included in the extracted video is greater than or equal to a reference value.

7. The electronic device of claim 6, wherein the processor is configured to determine the resolution to be extracted, based on at least one of a situation of the memory, a user setting, or a movement situation.

8. The electronic device of claim 1, wherein the processor is configured to identify an amount of motion detection at a time at which a user input for producing the slow motion video occurs, determine a slow motion video production time, based on the amount of motion detection, and produce the slow motion video, based on the slow motion video production time.

9. The electronic device of claim 8, wherein the processor is configured to compare a first amount of motion detection at the time at which the user input for producing the slow motion video occurs with a second amount of motion detection of a motion detection frame detected according to a degree of occurrence of motion between frames included in the video and determine the slow motion video production time, based on the comparison result.

10. The electronic device of claim 9, wherein the processor is configured to, if the second amount of motion detection is greater than the first amount of motion detection, determine a detection time of the motion detection frame as the slow motion video production time.

11. A method of operating an electronic device, the method comprising:
    obtaining a video processed by an image signal processor included in a camera of the electronic device;
    extracting a portion of the obtained video to detect motion;
    synchronizing the obtained video with the extracted video, based on the motion detection;
    producing a slow motion video by converting a frame rate of the synchronized video; and
    encoding the produced slow motion video and store the same in the memory of the electronic device;
    producing the slow motion video, based on a motion detection frame in which a degree of occurrence of motion between frames included in the video is greater than or equal to a reference value;
    obtaining a plurality of frames before the motion detection frame or a plurality of frames after the motion detection frame, produce interpolation frames, based on the obtained plurality of frames, and insert the produced interpolation frames into the plurality of frames to produce the slow motion video; and
    producing the slow motion video by synchronizing a time between the motion detection frame and the plurality of frames before and after the motion detection frame.

12. The method of claim 11, wherein the synchronizing comprises synchronizing the obtained video with the extracted video if a user input for selecting a shooting button is detected in a slow motion shooting mode, or if a degree of occurrence of motion between frames included in the video extracted in the slow motion shooting mode is greater than or equal to a reference value.

13. The method of claim 11, further comprising:
    extracting some frames from among a plurality of frames included in the obtained video;
    identifying whether a degree of occurrence of motion between frames is greater than or equal to a reference value, based on the extracted frames;
    synchronizing the obtained video with the extracted video if the degree of occurrence of motion between the frames is equal to or greater than a reference value; and
    determine a number of frames to be extracted, based on at least one of a situation of the memory, a user setting, or a movement situation.

14. The method of claim 11, further comprising:
    extracting a video having a lower resolution than the obtained video;
    identifying whether a degree of occurrence of motion between a frame and a subsequent frame included in the extracted video is greater than or equal to a reference value; and
    synchronizing the obtained video with the extracted video if the degree of occurrence of motion between the frames is equal to or greater than the reference value, wherein the frames of the obtained video corresponding to the frame and the subsequent frame are identified.

* * * * *